US008947482B2

(12) United States Patent
Ramesh et al.

(10) Patent No.: US 8,947,482 B2
(45) **Date of Patent: *Feb. 3, 2015**

(54) ACTIVE BIASED ELECTRODES FOR REDUCING ELECTROSTATIC FIELDS UNDERNEATH PRINT HEADS IN AN ELECTROSTATIC MEDIA TRANSPORT

(71) Applicant: Xerox Corporation, Norwald, CT (US)

(72) Inventors: Palghat S. Ramesh, Pittsford, NY (US); Joannes N. M. de Jong, Hopewell Juction, NY (US); Gerald M. Fletcher, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,263

(22) Filed: Mar. 15, 2013

(65) Prior Publication Data

US 2014/0267501 A1 Sep. 18, 2014

(51) Int. Cl.

*B41J 2/325* (2006.01)
*B41J 11/00* (2006.01)
*G01D 15/10* (2006.01)
*B41J 11/06* (2006.01)

(52) U.S. Cl.

CPC ................ *B41J 11/06* (2013.01); *B41J 11/007* (2013.01)

USPC .......................................................... 347/220

(58) Field of Classification Search

None

See application file for complete search history.

(56) References Cited

U.S. PATENT DOCUMENTS

| | | | |
|---|---|---|---|
| 3,760,229 | A | 9/1973 | Silverberg |
| 3,966,199 | A | 6/1976 | Silverberg |
| 4,827,295 | A | 5/1989 | Dean, II et al. |
| 5,124,729 | A | 6/1992 | Nakazawa et al. |
| 5,298,926 | A | 3/1994 | Fukushima et al. |
| 5,531,436 | A | 7/1996 | Ohyama et al. |
| 5,593,151 | A | 1/1997 | Mashtare et al. |
| 5,781,218 | A | 7/1998 | Wakahara et al. |
| 5,821,968 | A | 10/1998 | Ohyama et al. |
| 5,838,349 | A | 11/1998 | Choi et al. |
| 5,839,024 | A | 11/1998 | May et al. |
| 6,079,814 | A | 6/2000 | Lean et al. |
| 6,508,540 | B1 | 1/2003 | Lean et al. |
| 7,008,129 | B2 | 3/2006 | McNally et al. |
| 7,957,656 | B2 | 6/2011 | Moore et al. |

(Continued)

OTHER PUBLICATIONS

Zamankhan et al., "Effects of Corotron Size and Parameters on the Dielectric Substrate Surface Charge", Journal of Electrostatics, vol. 65, pp. 709-720; 2007.

*Primary Examiner* — Matthew Luu
*Assistant Examiner* — Erica Lin
(74) *Attorney, Agent, or Firm* — Hoffmann & Baron, LLP

(57) ABSTRACT

Embodiments described herein are directed to a system for reducing electrostatic fields underneath print heads in a direct marking printing system. The system includes: one or more print heads for depositing ink onto a media substrate; a media transport for moving the media substrate along a media path past the one or more print heads; a conductive platen contacting the media transport belt; an electrostatic field reducer that includes an alternating current charge device positioned upstream of the one or more print heads; and one or electrically isolated biased electrodes in registration with the ink deposition areas of the one or more print heads. The media transport includes a media transport belt and, when the media is on the transport belt it has an electrostatic field, which can cause printing defects. The electrostatic field reducer and electrodes reduce the electrostatic field on the surface of the media and thereby reduce printing defects.

17 Claims, 5 Drawing Sheets

(56) References Cited

U.S. PATENT DOCUMENTS

| | | | | |
|---|---|---|---|---|
| 8,840,241 | B2 * | 9/2014 | Fletcher et al. | 347/104 |
| 2004/0001134 | A1 * | 1/2004 | Nakazawa et al. | 347/101 |
| 2010/0061751 | A1 * | 3/2010 | Horike et al. | 399/55 |
| 2011/0025757 | A1 * | 2/2011 | Wong et al. | 347/33 |
| 2014/0028769 | A1 * | 1/2014 | Fletcher et al. | 347/104 |

* cited by examiner

ACTIVE BIASED ELECTRODES FOR REDUCING ELECTROSTATIC FIELDS UNDERNEATH PRINT HEADS IN AN ELECTROSTATIC MEDIA TRANSPORT

BACKGROUND

1. Technical Field

The presently disclosed technologies are directed to a system and method for reducing the magnitude of the electrostatic field as a printing media substrate is transported underneath print heads. The system and method described herein use active biased electrodes to reduce the magnitude of the electrostatic field on a printing media substrate and decrease potential print quality defects.

2. Brief Discussion of Related Art

In order to ensure good print quality in direct to paper ("DTP") ink jet printing systems, the media must be held extremely flat in the print zone. Some proposed methods for achieving this use electrostatic tacking of the media substrate to a moving transport belt that is held flat against a conductive platen in the imaging zones. An undesirable side effect of electrostatic tacking of media is the creation of a high electric field between the media and the imaging heads (also referred to herein as print heads). As the media travels in the printing zone, the high electrostatic field can affect the ink jetting, which results in print quality defects.

FIG. 1 depicts an exemplary prior art printing system. The media substrate (MS) is transported onto the hold-down transport using a traditional nip based registration transport with nip releases. As soon as the lead edge of the media is acquired by the hold-down transport, the registration nips are released. A vacuum belt transport is used to acquire the media substrate (MS) for the print zone transport (PZT).

FIG. 2 depicts an alternate prior art method for media acquisition wherein electrostatic forces are used to tack the media substrate (MS), e.g., paper, onto a transport belt (TB) that is supported by a metal conductive belt platen support (BS) underneath the print zone. The figure shows an exemplary media tacking method which is well known in the state of the art. The transport belt (TB) can be fabricated from relatively insulating (i.e., volume resistivity typically greater than $10^{12}$ ohm-cm) material. Alternatively, the transport belt (TB) can include layers of semi-conductive material if the topmost layer is made from relatively insulating material. If semi-conductive layers are included in the transport belt, the quantity "volume resistivity in the lateral or cross direction divided by the thickness of the layer" or "sheet resistivity" is typically above $10^8$ ohms/square for any such included layers. The basic belt transport system includes a drive roll (D), tensioning roll (T) and steering roll (S). The transport belt material may be an insulator or a semiconductor. The basic media tacking is shown in the dashed box upstream of the print heads (PH). Two rolls (1 and 2) are used. Roll 1 is on top of the belt/media and roll 2 is below the belt (TB). A high voltage is supplied across roll 1 and roll 2 to produce tacking charges that adhere the media substrate (MS) to the transport belt (TB). An optional blade (B) (shown upstream of the rollers) can be used to enhance tacking by forcing the paper against the belt just prior to the rollers. Biased roller charging is generally preferred but optionally, many other media charging means that are well known in the art can be employed in place of the biased roller pair shown. For the purposes of this disclosure, biased roller charging is inclusive of all of the various charging means that can be used.

Either roll 1 or roll 2 may be grounded, but there is a preference that roller 1 be grounded. This preference is mainly due to media tacking problems that can occur with very moist, low resistivity media due to conductive loss of charge on the media caused by lateral conduction of charge on the media to grounded conductive elements such as lead-in baffles that contact the media prior to the charging rollers. As is known in the art, this loss of charge can be solved by applying and/or inducing high voltages on the conductive lead-in baffles, but this adds some cost to supply the voltages. It requires that the baffles be well isolated from ground, and it also requires precautions to prevent machine operators from contacting the baffles during machine operation. Grounding the top roll avoids the need for any of this.

Since the top most surface of the transport belt is relatively insulating, charge can build up on the belt with each cycle of the belt. After a number of cycles, this can prevent adequate tacking of the media to the transport belt in the media charging zone. To avoid this, the charge state of the belt should be stabilized prior to the rollers 1 and 2 charging zone. In particular, the potential $V_S$ above the belt at a grounded roller just prior to the media charging zone (such as roller S in FIG. 2) should be kept to a relatively stable and controlled value for each belt cycle. The cyclic stabilization of the belt charge state can be accomplished by providing a charging device that faces one of the grounded rollers below the transport belt prior to the media charging zone. For example, a corotron charging device (not shown) at the roller T position in FIG. 2.

Media, tacked by electrostatic tacking methods, almost always produce an electric field. When the media travels through the print zone, the high electric field between the media and the print heads due to the electrostatic tacking can interact with the ink ejection. This can frequently produce print quality defects. Accordingly, it is desirable to reduce the magnitude of the electric field when the media passes the print heads in order to mitigate or eliminate print quality defects.

SUMMARY

According to aspects described herein, there is disclosed a system for reducing electrostatic fields underneath print heads in an electrostatic media. The system includes one or more print heads, a media transport, a conductive platen, one or more electrically isolated biased electrodes (also referred to herein as biased electrodes or electrodes) and one or more voltage sources. The one or more print heads deposit ink onto a media substrate in one or more ink deposition areas. The media transport moves the media substrate along a media path in a process direction past the one or more print heads. The media transport includes a media transport belt, which is preferably formed from insulating or semi-conductive materials. The semi-conductive materials can be formed in layers and can have a sheet resistivity greater than $10^8$ ohms/sq. The top most layer is preferably an insulating material (volume resistivity typically above $10^{12}$ ohm-cm). The media is electrostatically tacked to the transport belt which can create an electrostatic field.

A conductive platen with one or more apertures is located under the print heads and contacts the media transport belt. Preferably, the conductive platen is substantially flat. One or more electrically isolated biased electrodes are positioned in the one or more apertures that correspond to the locations of the one or more ink deposition areas of the one or more print heads. A print head section can include an array of many individual addressable nozzles that extend over some distance in the process and in the cross process directions.

Each of the one or more electrically isolated biased electrodes extends in the process direction and in a trans-process direction. Preferably, each of the electrically isolated biased electrodes has a dimension in the process direction and in the trans-process direction that extends at least 3 mm beyond the position of all of the nozzles in the corresponding ink deposition area, more preferably at least 5 mm. Most preferably, the conductive platen includes a plurality of electrically isolated biased electrodes that are arranged in a staggered full width array. A voltage source provides a voltage to each of the one or more electrically biased electrodes. Preferably, the voltage provided by the voltage source is from 1 to 3,000 volts, more preferably, the voltage source is controllable over a range of from 1 to 3,000 volts based on the electrostatic charge measured on the surface of the media. The voltage energizes the one or more electrically biased electrodes to reduce the electrostatic field on the surface of the media receiving the ink.

The system can also include a field probe or a non-contacting electrostatic voltmeter (ESV) for sensing the voltage above the media for measuring an electrical field located upstream of the one or more print heads in the process direction and/or a controller for adjusting the voltage provided to the one or more electrically isolated biased electrodes. In addition, the system can include one or more rollers for electrostatically tacking the media substrate onto the media transport belt and/or an electrostatic field reducer that includes a voltage sensitive charge device positioned upstream in the process direction of the one or more print heads. Preferably, the voltage sensitive charge device is a dicorotron operated at a shield voltage of zero or a scorotron with a grid operated at zero potential, wherein a coronode voltage is operated at conditions that drive the potential of media to zero voltage. The voltage sensitive charge device discharges onto the surface of the media substrate at a location above a grounded region of the conductive platen. The electrostatic field reducer reduces the electrostatic field to less than 1 V/micron on the surface of the media receiving the ink and preferably to less than 0.5 V/micron and most preferably to about 0 V/micron.

DETAILED DESCRIPTION

Figure 1:
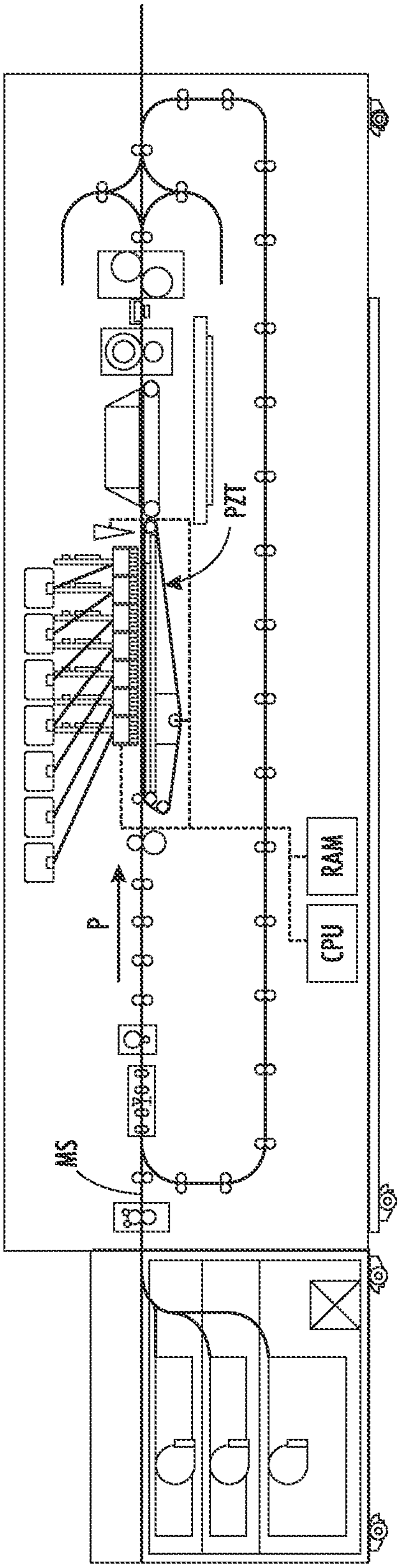
FIG. 1 PRIOR ART
FIG. 1 depicts a prior art ink jet printing system that uses nip based registration transport to transport media past the print heads.
Figure 2:
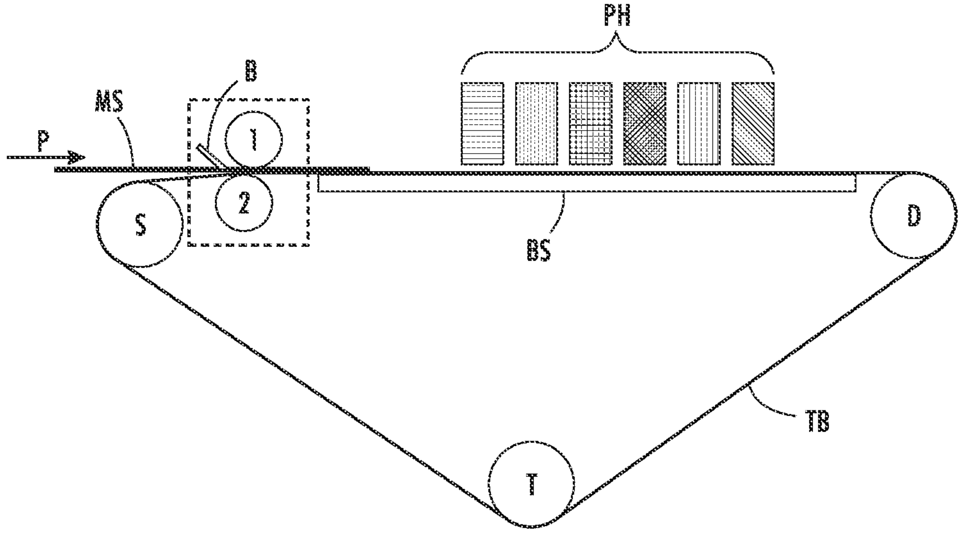
FIG. 2 PRIOR ART
FIG. 2 depicts a prior art ink jet printing system that uses electrostatic tacking to transport media past the print heads.

The exemplary embodiments are now discussed in further detail with reference to the figures.

As used herein, “substrate media” and “media” refer to a tangible medium, such as paper (e.g., a sheet of paper, a long web of paper, a ream of paper, etc.), transparencies, parchment, film, fabric, plastic, photo-finishing papers or other coated or non-coated substrates on which information or on an image can be printed, disposed or reproduced. While specific reference herein is made to a sheet or paper, it should be understood that any substrate media in the form of a sheet amounts to a reasonable equivalent thereto As used herein, the term “charge device” refers to a device that emits an electrostatic charge to a predetermined location.

As used herein, the terms “electrically isolated biased electrodes,” “biased electrodes” and “electrodes” refer to electrodes for discharging a predetermined voltage that are located in the platen but are insulated so that they do not electrically contact the platen.

As used herein, the terms “process” and “process direction” refer to a direction for a process of moving, transporting and/or handling a substrate media. The process direction substantially coincides with a direction of a flow path P along which the substrate media is primarily moved within the media handling assembly. Such a flow path P is the flow from upstream to downstream. A “lateral direction” or “trans-process direction” are used interchangeably herein and refer to at least one of two directions that generally extend sideways relative to the process direction. From the reference of a sheet handled in the process path, an axis extending through the two opposed side edges of the sheet and extending perpendicular to the process direction is considered to extend along a lateral or trans-process direction.

As used herein, “volume resistivity” or “specific insulation resistance” of a material refers to the quantity [R A/t], where R is the electrical resistance through a thickness t of the material and between opposite faces of area A of the material and it is typically expressed in ohm-centimeters or ohm-cm.

As used herein, “sheet resistance” or “surface resistivity” refers to a measure of resistance of thin films that are nominally uniform in thickness and that have substantially the same electrical properties throughout the thickness (t) of the film. Sheet resistance is the quantity volume resistivity divided by the film thickness (t) and it is applicable to two-dimensional systems in which thin films are considered as two-dimensional entities. When the term surface resistivity or sheet resistance is used, it is implied that the current flow is substantially along the plane of the sheet, not perpendicular to it. Because the volume resistivity (ohm-cm) is divided by the thickness term (cm), the units of sheet resistance are technically ohms but the surface resistivity is typically referred to as “ohms per square” (ohms/sq.), where the “square” is a dimensionless quantity used to distinguish between a simple resistance value and a surface resistivity value.

As used herein, an “image” refers to visual representation, such as a picture, photograph, computer document including text, graphics, pictures, and/or photographs, and the like, that can be rendered by a display device and/or printed on media.

As used herein, a “phase change ink-jet printer” refers to a type of ink-jet printer in which the ink begins as a solid and is heated to convert it to a liquid state. While it is in a liquid state, the ink drops are propelled onto the substrate from the impulses of a piezoelectric crystal. Once the ink droplets reach the substrate, another phase change occurs as the ink is cooled and returns to a solid form instantly. The print quality is excellent and the printers are capable of applying ink on almost any type of paper or transparencies.

As used herein, “corona device” refers to a charging device that generates a controlled corona discharge by applying a high voltage to a coronode (such as a thin wire or sharp pins)

that is spaced above the surface being charged. Typically, a corona device has some type of shield. If high voltage DC is applied to the coronode, the device is typically referred to as a DC corona device and the shield material is typically strongly preferred to be metal. The shield can be grounded or alternatively biased. If high voltage AC is applied to the coronode, the device is typically referred to as an AC corona device and the shield is optionally metal or an insulating material. Depending on the application, AC corona devices generally add some level of DC to the high AC voltage applied to the coronode. The high voltages applied to the coronode ionize the space very near the coronode and the ions are repelled by the coronode voltage and flow toward the surface being charged.

As used herein, "a voltage sensitive charge device" refers to a device that tends to drive the potential of a surface moving past the device to a fixed controlled level.

As used herein, a "location" refers to a spatial position with respect to a reference point or area.

As used herein, a "media printing system" or "printing system" refers to a device, machine, apparatus, and the like, for forming images on substrate media using ink, toner, and the like, and a "multi-color printing system" refers to a printing system that uses more than one color (e.g., red, blue, green, black, cyan, magenta, yellow, clear, etc.) ink or toner to form an image on substrate media. A "printing system" can encompass any apparatus, such as a printer, digital copier, bookmaking machine, facsimile machine, multi-function machine, etc. which performs a print outputting function. Some examples of printing systems include Xerographic, Direct-to-Paper (e.g., Direct Marking), modular overprint press (MOP), ink jet, solid ink, as well as other printing systems.

Figure 3:
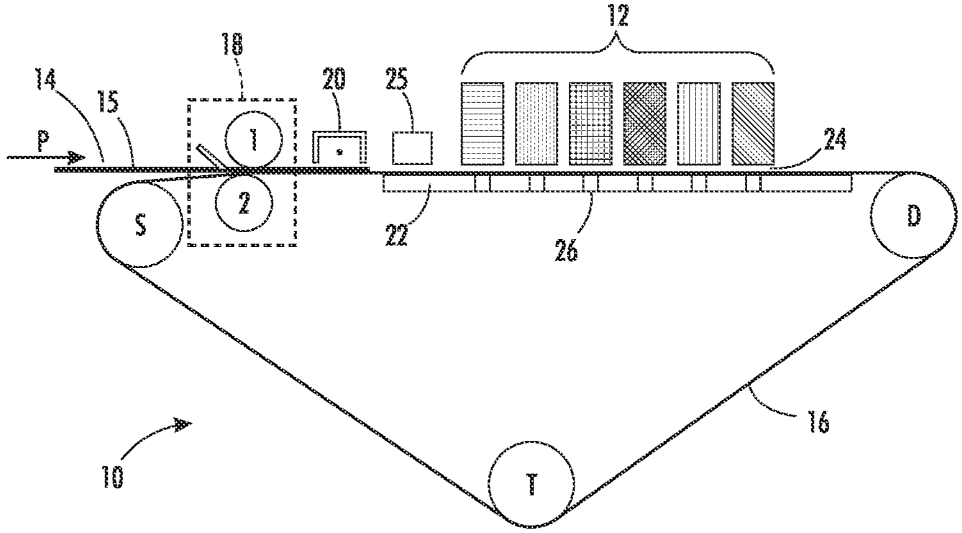
FIG. 3 depicts an embodiment of the ink jet printing system that uses electrostatic tacking to transport media past the print heads and a charge device and biased electrodes in the platen below the ink deposition area to reduce the electrostatic field below the print heads.

Exemplary embodiments included are directed to a system for reducing electrostatic fields underneath print heads including; a set of print heads for ejecting ink onto a substrate media, a means of moving the media substrate past the print heads using a print zone transport (i.e., the portion of the media transport in the zone where the print heads are located), which includes an insulating or semi-conductive belt transport materials of specifiable electrical properties (such as belt resistivity), a conductive platen against which the print zone transport is held flat, an electrostatic charge generator for generating electrostatic charges for holding media against the print zone transport belt so that media is held flat and one or more biased-conductive areas. Optionally, an electrostatic field reducer system can be included. The electrostatic field reducer system is located downstream of the media charging zone and upstream of the print heads in a region where there is a portion of a grounded conductive supporting platen below the belt. The electrostatic field reducer uses a voltage sensitive charging device having sufficient bare plate characteristic slope to drive the potential above the media on the transport belt substantially to zero after it passes the device. For example, if a scorotron is chosen for the voltage sensitive device, then the grid potential will be set to zero potential (ground). Without care a zero volt condition above the media past the field reducer can lead to low charge on the media and resultant poor tacking of the media to the transport belt. Referring to FIG. 3, low tack force at a zero volt condition above the media is avoided by controlling the surface potential $V_S$ above the belt prior to the media charging zone to a high voltage condition. The charge on the media at a zero volt condition above the media will then be directly proportional to $V_S$.

The cyclic surface potential $V_S$ can be controlled using a voltage sensitive charging device above any of the belt transport rollers D, C or S prior to the charging zone and by choosing a controlled high level for the intercept voltage condition. In general, the cyclic charge state of the transport belt needs to be controlled with or without the use of the optional electrostatic field reducer because otherwise very high charge levels would eventually build up after many belt cycles. This would eventually prevent adequate charging of the media at the media charging zone.

The voltage stabilizing charging device is typically referred to in the art as a "voltage sensitive device." The term "voltage sensitive" refers to a simple test where a biased conductive plate is positioned below the device, and the current per length of device is measured as a function of the applied voltage on the plate. "Voltage sensitive" generally means that the DC current to the plate goes to a negligible level at a defined voltage on the plate known as the "intercept level" and the slope of the curve of current to the plate vs. voltage on the plate is large. The curve of plate current vs. plate voltage is generally referred to as the "bare plate characteristics." In the art, a scorotron is an example of a well-known device that can typically be referred to as "voltage sensitive." A scorotron typically consists of a corona device for charge generation (such as a thin wire or sharp pin coronode device) operated at high DC or AC potential, with a conductive grid arrangement placed between the coronode and the surface to be charged. If the slope of the bare plate characteristic curve is "sufficiently large," the voltage of a surface moving past the device will tend to go to the applied potential of the "intercept level" of the bare plate characteristic, which typically is near the potential applied to the grid. It is well known that "sufficiently large" is directly proportional to the speed that the surface passes the device, and is inversely proportional to the effective capacitive thickness of the system passing below the device. In the art, there are many devices that can behave in a "voltage sensitive" manner and this characteristic is most preferred for the voltage stabilizing device.

For this application, the voltage sensitive device is positioned in a region downstream of the media charging station where there is a grounded conductive platen directly below the belt. To drive the field between the media and the print heads toward zero, the voltage sensitive stabilizing device is used to drive the potential above the media on the belt transport toward zero at a point past the voltage stabilizing charging device. In general, this requires that the voltage stabilizing device has a bare plate characteristic curve having an intercept level near zero. For example, if a scorotron is used this generally means operating the grid of the device at a zero potential.

Achieving a zero voltage condition with the voltage stabilizing device must be done without driving the net charge on the media to zero because zero media charge would cause no tacking force between the media and the transport belt. Creating zero potential above the media on the belt while still maintaining high media charge can be done using a controlled cyclic belt charge condition prior to the media charging zone. In a preferred arrangement, the potential of the belt $V_S$ is controlled to be a high and relatively stable level using the cyclic stabilizing device. Then, when the potential above the media is driven toward zero after the voltage sensitive device, the charge on the media will be high and proportional to quantity $V_S$ divided by the effective capacitive thickness of the media being tacked to the belt. The preferred media charging arrangement where a roller is grounded and the opposing rollers biased will further insure high media charge and tacking for a condition where the voltage above the media is driven to zero by the voltage stabilizing device.

If the voltage above the media on the belt stayed zero during the dwell time for transport between the voltage stabilizing charging device and the print heads, the field between the media and the grounded print heads would be zero. Unfortunately, conductive charge migration through the thickness of the media can occur during the dwell time and this alters the potential above the media. This in turn causes a field between the media and the print heads under certain stress conditions of media resistivity. The rate of charge migration depends on the resistivity of the media and this generally depends to a considerable extent on the moisture content in the media. Thus, without countermeasures, certain stressful relative humidity conditioning of the media can create fields between media and the print heads. The voltage applied to the isolated electrodes in the print zones is controlled and chosen to be equal and opposite polarity to the voltage above the media prior to the print zones so that the field in the print zones is low in spite of charge migration through the media. The electrostatic field reducer reduces the electrostatic field to less than 1 V/micron on the surface of the media receiving the ink and preferably to less than 0.5 V/micron and most preferably to about 0 V/micron.

The voltage sensitive charging devices used for the field reducer and for the belt cyclic charge conditioning can be optionally AC or DC corona charging devices. However, if DC devices are chosen, the polarity of the high voltage on the coronode must be chosen consistent with the bias arrangement used for the media charging station. This is because DC coronode devices have only one polarity of charge available from the device. If DC is used, the polarity of devices should be opposite to the polarity of the charge deposited onto the surface of the media by the charging station. AC biased coronode devices have both polarities of charge available from the coronode and thus these do not have to be concerned about this issue.

The conductive platen supports the belt in the print zone and, in order to reduce the electric field, has biased-conductive areas formed in the platen in the vicinity of the ink ejecting area. The biased-conductive areas preferably consist of one or more electrically isolated biased electrodes embedded in apertures in the conductive platen that are in registration with the one or more ink deposition areas of the print heads. Preferably, an electrically isolated biased electrode is correspondingly located in alignment with each print head. The potential of each electrically isolated biased electrode can be controlled to different potentials at each print head station. The system includes field probe or a non-contact electrostatic voltmeter (ESV) sensor positioned prior to the print head in a region where there is a grounded section of the conductive support platen below the belt. Preferably there is an ESV sensor just prior to each print head. The voltage above the media prior to the print head is sensed and the inverse of this voltage is applied to the isolated biased electrode below the following print head. The voltage can be applied to the isolated electrode at a fixed time after the sensor reading to account for the dwell time that the media takes to move from the sensor to the print zone. The system and method significantly reduce the electrostatic field in the ink deposition areas and consequently reduce print quality defects.

If the voltage above the media downstream of the voltage sensitive field reducing device remained at zero potential during the dwell time for travel between the device and the print head zones, then the field between the media and the print head would be zero when the electrodes potential in the platen below the print head is set to zero. However, charge conduction can occur through the thickness of the media during the dwell time and this will change the potential above the media. Without compensation, high fields can then occur between the media and the print head under certain media stress conditions. The time it takes for the potential to change above the media depends on the resistivity of the media and this in turn typically depends strongly on the moisture content in the media (which depends on the environment).

By applying a bias to the electrodes, the field in the vicinity of the print heads can be reduced. A field probe with a controller located just upstream of the print zone can be used to adjust the bias. Instead of the field probe, an ESV sensor with a controller can be used and positioned just prior to the print zones where there is a grounded portion of the supporting conductive platen below the transport belt. The voltage on the electrically isolated electrodes is controlled to be equal and opposite in polarity to the measured ESV voltage. Since the measured voltage can be different in regions of the belt that are covered with media versus positions that are not covered by media, the controlled voltage on the isolated electrodes is preferably delayed by a time equal to the dwell time between the position of the measuring device and the position of the print heads. ESV probes are readily available and are widely used in the art. A Keyence Sensor, which measures distance or proximity very accurately, can also be used to determine if the paper is being held flat, indicating good electrostatic media tacking (electrostatic pressure) to the belt and platen.

In extreme stress cases of certain media resistivity ranges, the voltage can continue to change during the dwell times between each print head zone. To provide low field for stress media conditions, separate sensing prior to the head and voltage control below the head can be applied to each imaging head to compensate for volume charge conduction through the media thickness during the transport dwell times between heads.

Referring now to the figures. FIG. 3 shows an embodiment of the system 10 for reducing electrostatic fields under print heads 12. As the media 14 is fed onto the transport belt 16 from the left in FIG. 3, it is electrostatically tacked to the belt 16 by an electrostatic tacking device 18, which creates an electrostatic field that holds the media 14 closely to the belt 16 as it moves in the process direction P. In addition to holding the media 14 on the belt 16, the electrostatic field can affect the deposition of ink on the surface 15 of the media 14 by the inkjet print heads 12 and cause printing defects. Therefore, in order to neutralize the electrostatic field, current voltage sensitive charge device 20 is positioned between the electrostatic tacking device 18 and the print zone (i.e., the location of the inkjet print heads 12). The device 20 is positioned in a region where there is a grounded section of the conductive belt support platen 22 below the belt 16. The voltage sensitive charging device 20 is operated at conditions that drive the potential above the moving media to zero just after passing the device. The voltage sensitive charge device 20 can be selected from several well-known and commercially available devices. To prevent low charge level on the media at a zero volt condition above the media (and resulting loss of tack force), voltage sensitive device 30 drives the surface potential $V_S$ of the belt 16 to a high level and of opposite polarity to the polarity of charge deposited onto the media by the media charging station 18. For example, if roller 1 is grounded and roller 2 positively biased, then negative charge is deposited onto the media by 18. Then device 30 should be chosen to drive potential $V_S$ to a high positive level. Preferably, for high tack force at a zero volt condition above the media 14 the magnitude for $V_S$ should be typically 2000 volts and more preferably 3000 volts. Since the media charge is proportional to the level of $V_S$ and can decrease with increasing media thickness for very low moisture media, thicker low moisture media generally can prefer higher voltages than thinner or higher moisture media conditions. Optionally, the machine can include means to determine the media being printed and the environmental conditions that affect media moisture and can use a lookup table to adjust the level of $V_S$ ensure adequate tacking for the particular media and environmental conditions.

After the charge device 20, the belt 16 transports the media 14 as it moves along platen 22 and under the print heads 12 where ink is deposited on the media 14 in one or more ink deposition areas 24. Although the field above the media 14 and belt 16 can be reduced to a very low value by the device 20, charge conduction through the thickness of the media toward the belt surface interface can occur during the dwell time between the device 20 position and the print heads with certain stressful media resistivity conditions. If the supporting platen 22 below the belt 16 in the print head zones is grounded, this can cause a high field to occur between the media 14 and the print heads 12. In order to reduce this field, one or more electrically isolated biased electrodes 26 are embedded in one or more apertures 28 in the platen 22 (see FIG. 4). The electrodes 26 are correspondingly located (i.e., in registration) with the ink deposition areas 24 so that they provide a bias electronic charge to the media 14 in the area where the ink is deposited. An ESV probe 25 before the print heads 12 measures the voltage above the media 14 right in a grounded region of the platen 22 just prior to the print zone and sends a signal via a controller 30 (see FIG. 5) to regulate the voltage to the isolated biased electrodes 26 to a level that is equal in magnitude and opposite in polarity to the ESV reading. This ensures that any voltage change above the media 14 caused by conductive charge migration through the media 14 will be compensated for by the counter voltage applied in the print zones. This in turn drives the field in the print zones to low values, which minimizes any interference with the printing. To handle extremely stressful media conditions, individual ESV sensing and separate control of the voltages on each electrode 26 below each print head 12 is provided. Also, to minimize the presence of high fields in the regions between media transport, the voltage on the electrodes 26 is time delayed an amount equal to the dwell time for belt travel from the ESV sensor to the print head 12.

Figure 4:
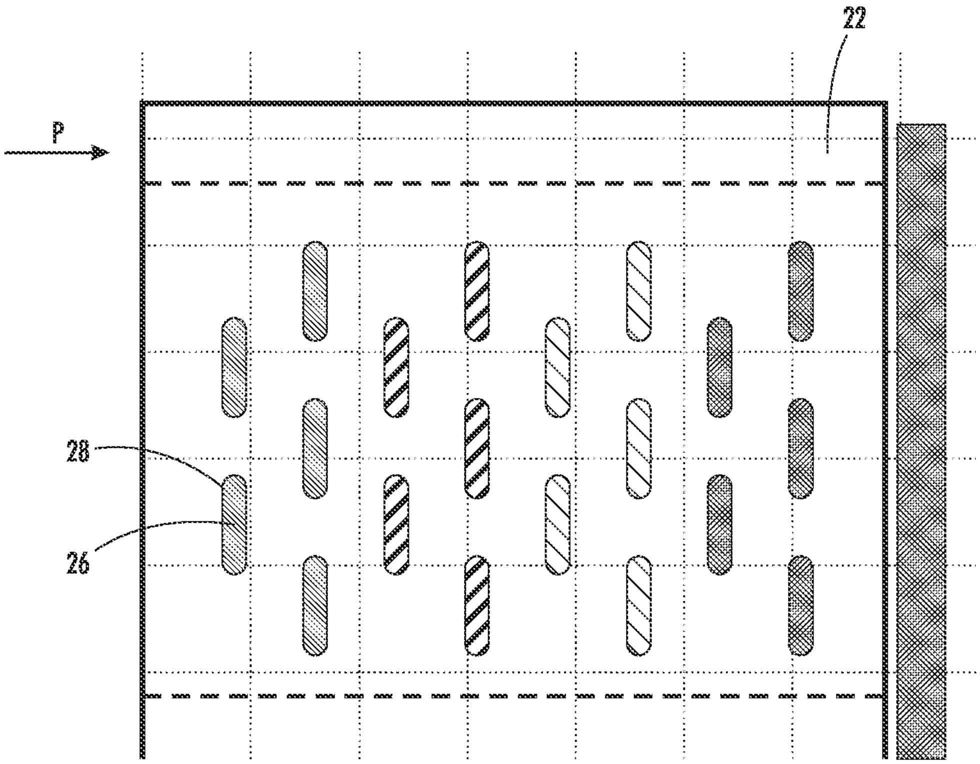
FIG. 4 depicts a top view of a conductive platen with a plurality of biased electrodes located in apertures that correspond to the locations of the ink deposition areas.

A preferred embodiment of the system 10 for reducing electrostatic fields underneath print heads 12 uses embedded electrodes 26 in the platen 22 (i.e., the metal conductive belt support) arranged in staggered full width arrays ("SFWAs"). FIG. 4 is a top view showing the belt 16 supported by the platen 22 with the embedded electrodes 26 arranged in SWFA. The process direction P is left to right and the locations of the embedded electrodes 26 correspond to (i.e., are in registration with) the ink deposition areas 24 (i.e., areas on the media 14 onto which ink is ejected from the print heads 12) of the print heads 12. The apertures 28 have a width in the process direction P and a length in the trans-process direction. The length is preferably greater than the width and the width is at least 20 mm, preferably at least 25 mm and most preferably at least 30 mm. The electrodes 26 can be biased and independent of the surrounding platen 22. This allows any electric charges in the ink deposition areas 24 to be reduced so that they do not interfere with the printing. A pair of columns of embedded electrodes 26 is dedicated to each print head 12 and the apertures 28 overlap to provide continuous printing in the process direction P, as well as the trans-process direction. FIG. 4 shows eight columns of apertures 28 that can accommodate print heads 12 for inks of four different colors.

Figure 5:
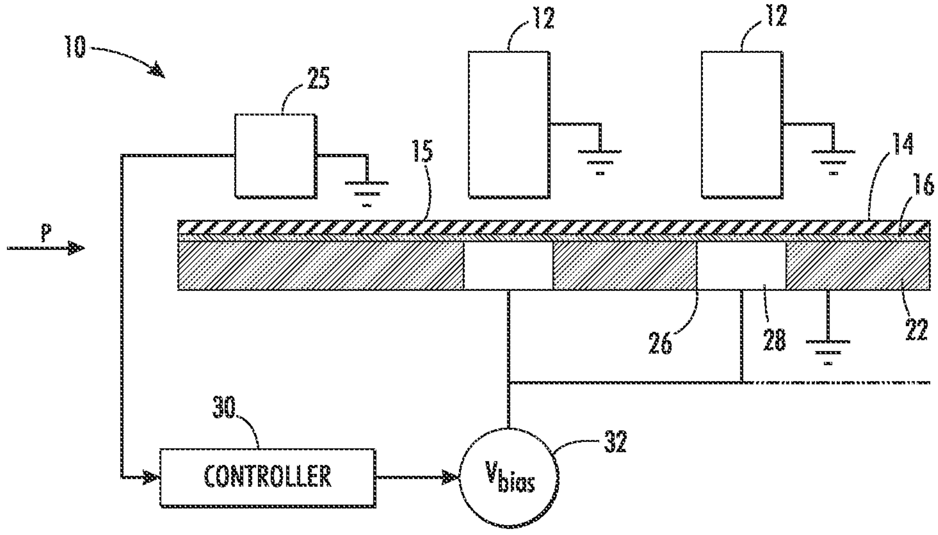
FIG. 5 depicts an embodiment of the ink jet printing system that uses a field probe and controller to adjust the bias applied to the electrodes in the platen located below the ink deposition areas.

FIG. 5 shows a configuration of the system 10 with two print heads 12 to illustrate the operation of the system 10. The transport belt 16 moves the media 14 in a process direction P from left to right. As the media 14 passes under the print heads 12, the different inks are deposited onto the surface 15 of the media 14 at locations that are in registration with the embedded electrodes 26 in the platen 22. The output from the ESV probe 25 is fed into a controller 30 (e.g., a PID controller), which adjusts the bias of the voltage source device 32 that applies voltage to the electrodes 28 to drive the electrical field on the surface of the media 14 toward zero.

FIG. 5 shows the electrodes 28 in the print zone are all electrically connected such that the same bias is applied to each of them. However, volume charge relaxation across the media thickness during the dwell time between imaging heads (i.e., print heads 12) may make it desirable to have different biases for each subsequent print head 12. This is especially desirable for media with certain stress ranges of media conductivity. In such cases, additional field probes 25 (or ESV sensors) can be used to independently adjust the electrodes 28 and individually bias the electrostatic charges in the ink deposition areas 24 of the downstream print heads 12. This allows the downstream print heads 12 to have different optimized levels than the print heads 12 located further upstream. In a preferred embodiment, two or three ESVs are positioned at intervals upstream of the first print head 12 to sense the rate of charge decay through the media thickness and this information can be used with a lookup table to choose the appropriate different voltage levels for each individual electrode 28 below the subsequent print heads 12 so that the fields will be maintained low at each print head 12.

Figure 6:
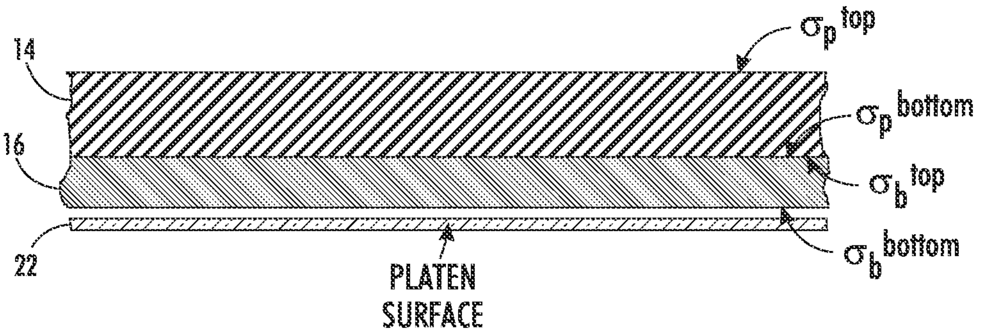
FIG. 6 depicts a side view of the platen, transport belt and a sheet of paper on the surface of the belt and shows the charge distribution.

The electrical field under the print heads 12 is determined to a large extent by the charge distribution in the belt 16 and paper 14. The charge distribution in the paper (i.e., the media 14) and belt 16 is complex (see FIG. 6) and depends on many factors such as belt conductivity, which may vary with the age of the belt and with environmental conditions and paper conductivity, which can vary across paper types and across reams and is a strong function of the environmental conditioning of the paper. For example, due to charge conduction and other factors, the media 14 can have a different charge on the top surface ($\sigma_p^{top}$) and on the bottom surface ($\sigma_p^{bottom}$) and the belt 16 can also have a different charge on the top surface ($\sigma_b^{top}$) and on the bottom surface ($\sigma_b^{bottom}$), which would make it difficult to determine the voltage above the media prior to the print heads and thus the electrostatic field under the print heads 12. The ESV sensor just prior to the print head 12 accounts for the various charge conditions on the media 14 and the belt 16 and the adjustable bias system 10 of the present invention enables the electrostatic field to be adjusted to provide low fields in the printing zone independent of the complex charge state of the media 14 and belt 16. The bias is automatically adjusted via the control system to achieve the desired low field state for wide ranges of media and belt charge state conditions.

In another exemplary embodiment, an ink sensor, such as the image on paper ("IOP") sensor located downstream of the print zone can be used to estimate the image quality ("IQ") attributes of the drop (e.g., directionality) and used to adjust the bias.

EXAMPLE

A model was developed to study electric fields in the print zone for realistic charge distributions in the belt and paper (obtained from detailed simulation of air breakdown in the paper and belt charging nips), for various platen designs. The model was validated with experimental data.

Figure 7:
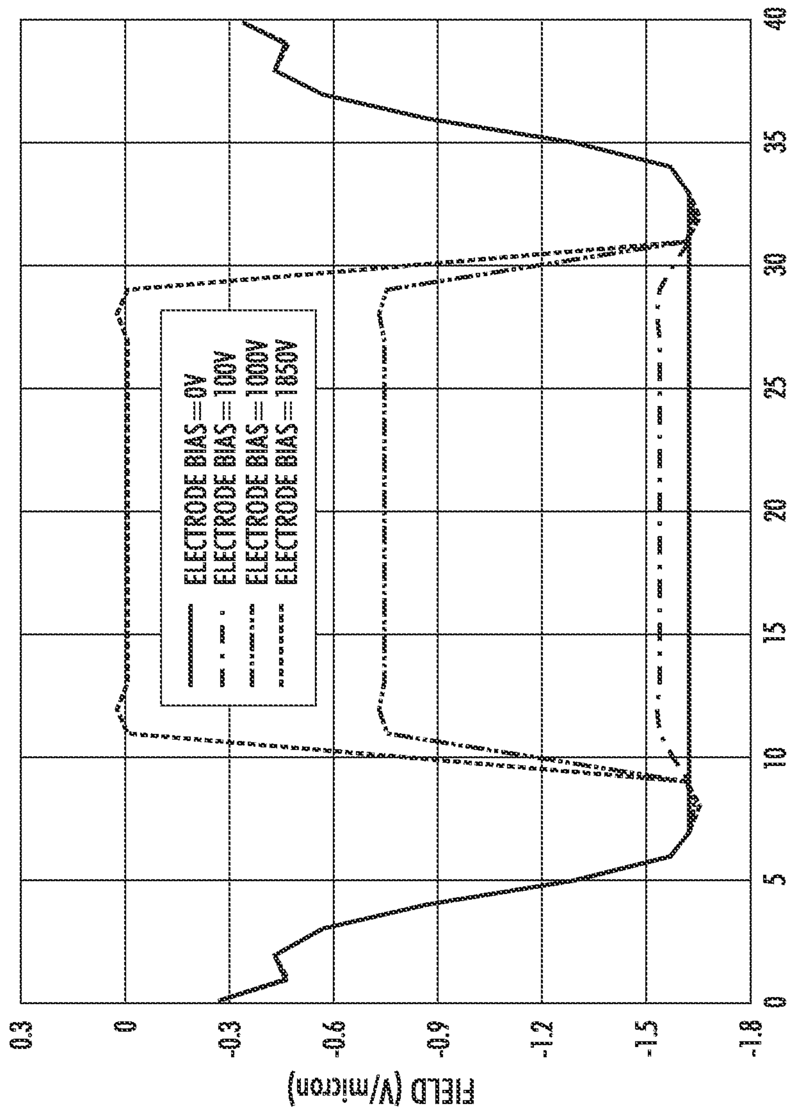
FIG. 7 is a graph that illustrates the electrostatic field at the print heads for various biases between 0 and 1850 volts.

FIG. 7 is a graph that shows the electric field at the print head for a grounded platen and, an electrode embedded in the platen at various biases (0, 100, 1000 and 1850 volts). The graph shows that there exists an optimal bias that can reduce the electrostatic field at the print head surface significantly. For the example below, a bias of 1850V is observed to lower the field in the print zone to almost zero.

It will be appreciated that various embodiments of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A system for reducing electrostatic fields underneath print heads, the system comprising:

one or more print heads for depositing ink onto a surface of a media substrate in one or more ink deposition areas;

a media transport for moving the media substrate along a media path in a process direction past the one or more print heads, wherein the media transport comprises a media transport belt having a first side and a second side, and wherein the media substrate has an electrostatic field and contacts the first side;

a conductive platen contacting the media transport belt on the second side, wherein the conductive platen has one or more apertures;

one or more electrically isolated biased electrodes positioned in the one or more apertures and corresponding to the locations of the one or more ink deposition areas of the one or more print heads, and wherein each of the one or more electrically isolated biased electrodes extends in the process direction and in a trans-process direction; and one or more voltage sources for providing a voltage to the one or more electrically biased electrodes, wherein the voltage is provided to the one or more electrically biased electrodes to reduce the electrostatic field on the surface of the media receiving the ink.

2. The system for reducing electrostatic fields underneath print heads according to claim 1, wherein the conductive platen is substantially flat.

3. The system for reducing electrostatic fields underneath print heads according to claim 1 further comprising a field probe or a non-contacting electrostatic voltmeter for measuring an electrical field at a location upstream in the process direction of the one or more print heads.

4. The system for reducing electrostatic fields underneath print heads according to claim 3 further comprising a controller for adjusting the voltage provided to the one or more electrically isolated biased electrodes.

5. The system for reducing electrostatic fields underneath print heads according to claim 3, wherein the one or more electrically isolated biased electrodes has a dimension in the process direction and in a trans-process direction that extends at least 3 mm beyond the corresponding ink deposition area.

6. The system for reducing electrostatic fields underneath print heads according to claim 3, wherein the one or more electrically isolated biased electrodes has a dimension in the process direction and in a trans-process direction that extends at least 5 mm beyond the corresponding ink deposition area.

7. The system for reducing electrostatic fields underneath print heads according to claim 1, wherein the media transport belt is formed from insulating or semi-conductive materials.

8. The system for reducing electrostatic fields underneath print heads according to claim 7, wherein the semi-conductive materials in the media transport belt are formed in layers and have a sheet resistivity greater than $10^8$ ohms/sq.

9. The system for reducing electrostatic fields underneath print heads according to claim 1, wherein the voltage provided by the voltage source is from 1 to 3,000 volts.

10. The system for reducing electrostatic fields underneath print heads according to claim 1, wherein a plurality of electrically isolated biased electrodes are arranged in a staggered full width array.

11. The system for reducing electrostatic fields underneath print heads according to claim 1, wherein the system further comprises one or more rollers for electrostatically tacking the media substrate onto the media transport belt.

12. The system for reducing electrostatic fields underneath print heads according to claim 1 further comprising an electrostatic field reducer comprising a voltage sensitive charge device positioned upstream of the one or more print heads in the process direction.

13. The system for reducing electrostatic fields underneath print heads according to claim 12, wherein the voltage sensitive charge device is a scorotron with a grid operated at zero potential, and wherein a coronode voltage is operated at conditions that drive the potential of media to zero voltage.

14. The system for reducing electrostatic fields underneath print heads according to claim 12, wherein the voltage sensitive charge device is a dicorotron operated at a shield voltage of zero.

15. The system for reducing electrostatic fields underneath print heads according to claim 12, wherein the voltage sensitive charge device discharges onto the surface of the media substrate at a location above a grounded region of the conductive platen.

16. The system for reducing electrostatic fields underneath print heads according to claim 1, wherein the electrostatic field reducer reduces the electrostatic field to less than 5 V/micron on the surface of the media receiving the ink.

17. The system for reducing electrostatic fields underneath print heads according to claim 1, wherein the electrostatic field reducer reduces the electrostatic field on the surface of the media receiving the ink to less than 1 V/micron.

* * * * *